United States Patent
Won et al.

(10) Patent No.: US 12,519,222 B2
(45) Date of Patent: Jan. 6, 2026

(54) ELECTRONIC DEVICE INCLUDING PLURALITY OF ANTENNAS AND WIRELESS COMMUNICATION METHOD USING THE SAME

(71) Applicant: Samsung Electronics Co., Ltd., Suwon-si (KR)

(72) Inventors: Dongsu Won, Suwon-si (KR); Seunghwan Kim, Suwon-si (KR); Hongchil Kim, Suwon-si (KR); Bongdae Lee, Suwon-si (KR); Hyung Sun Lim, Suwon-si (KR); Youngchan Choi, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 87 days.

(21) Appl. No.: 18/641,663

(22) Filed: Apr. 22, 2024

(65) Prior Publication Data
US 2024/0396207 A1 Nov. 28, 2024

(30) Foreign Application Priority Data

May 22, 2023 (KR) .................... 10-2023-0065668
Jul. 27, 2023 (KR) .................... 10-2023-0098523

(51) Int. Cl.
*H01Q 3/24* (2006.01)
*H01Q 1/24* (2006.01)
(Continued)

(52) U.S. Cl.
CPC .............. *H01Q 3/24* (2013.01); *H01Q 1/247* (2013.01); *H01Q 21/30* (2013.01); *H04B 17/328* (2023.05); *H04B 17/382* (2015.01)

(58) Field of Classification Search
None
See application file for complete search history.

(56) References Cited

U.S. PATENT DOCUMENTS

| | | | |
|---|---|---|---|
| 6,298,092 B1 | 10/2001 | Heath, Jr. et al. | |
| 6,538,612 B1 * | 3/2003 | King .................... | H01Q 1/3275 343/765 |

(Continued)

FOREIGN PATENT DOCUMENTS

| | | |
|---|---|---|
| CN | 113676989 A | 11/2021 |
| CN | 114172535 A | 3/2022 |

(Continued)

*Primary Examiner* — Wilson Lee
(74) *Attorney, Agent, or Firm* — Harness, Dickey & Pierce, P.L.C.

(57) ABSTRACT

An electronic device includes antennas to receive a satellite signal from a satellite, electrical paths connected to the antennas, each of the electrical paths including a band pass filter to pass a signal of a corresponding frequency band, a bypass path connected in parallel with the electrical paths and connected to the antennas, and processing circuitry connected to the electrical paths and the bypass path, the processing circuitry being configured to receive the satellite signal through a first antenna and a first electrical path based on a quality of a signal received through the first electrical path connected to the first antenna being highest among qualities of respective signals received through the electrical paths, and receive the satellite signal through one of the antennas and the bypass path based on an intensity of a signal received through the first electrical path being less than a reference value.

20 Claims, 11 Drawing Sheets

(51) Int. Cl.
    *H01Q 21/30*     (2006.01)
    *H04B 17/318*    (2015.01)
    *H04B 17/382*    (2015.01)

(56) References Cited

U.S. PATENT DOCUMENTS

| | | |
|---|---|---|
| 7,457,639 B2 | 11/2008 | Subramaniam et al. |
| 10,361,798 B1 * | 7/2019 | Galan ................. H04B 17/318 |
| 11,677,145 B1 * | 6/2023 | Sharma ............... H01Q 3/2682 |
| | | 342/372 |
| 2003/0214449 A1 * | 11/2003 | King ...................... H01Q 3/08 |
| | | 343/765 |
| 2016/0093958 A1 * | 3/2016 | Mortazawi ............... H03F 1/56 |
| | | 330/144 |
| 2019/0090209 A1 * | 3/2019 | Zoltan ............... H04B 7/15578 |
| 2020/0212993 A1 * | 7/2020 | Ashworth ............ H03G 3/3042 |
| 2022/0346035 A1 | 10/2022 | Ioffe et al. |
| 2023/0045918 A1 | 2/2023 | Jiang et al. |
| 2023/0199685 A1 * | 6/2023 | Ghanbarinejad .... H04B 7/1855 |
| | | 370/329 |
| 2023/0239060 A1 * | 7/2023 | Jayasimha .......... H04L 27/2626 |
| 2023/0262677 A1 | 8/2023 | Zhou et al. |
| 2024/0179594 A1 * | 5/2024 | Polaganga ............ H04W 36/30 |
| 2024/0305250 A1 * | 9/2024 | Abouzied ............... H03F 1/523 |

FOREIGN PATENT DOCUMENTS

| | | |
|---|---|---|
| CN | 114375040 A | 4/2022 |
| CN | 114844535 A | 8/2022 |
| KR | 100784744 B1 | 12/2007 |
| KR | 10-2023-0017673 A | 2/2023 |

* cited by examiner

[FIG. 1]
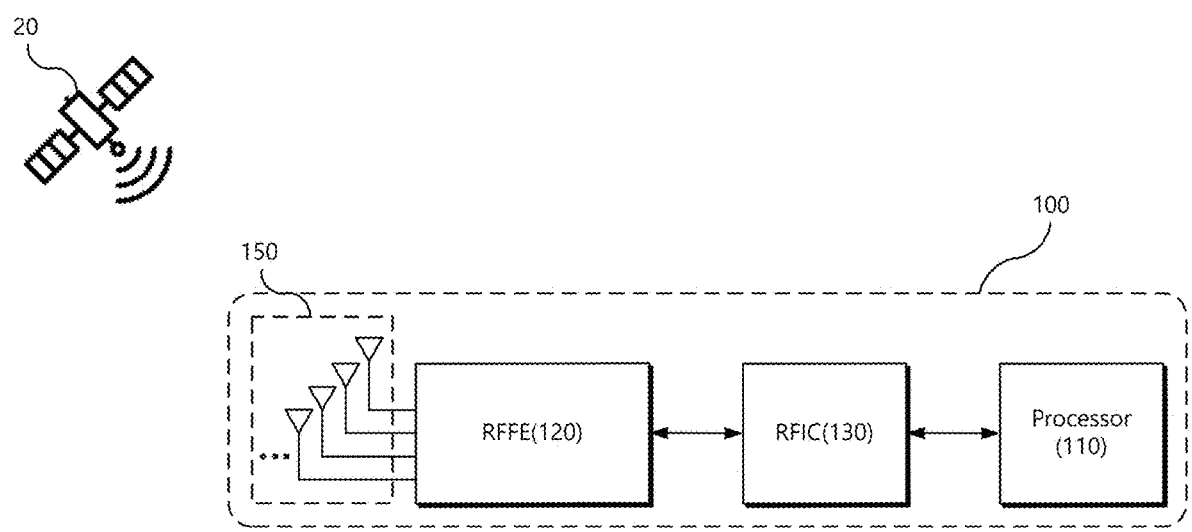

[FIG. 2]
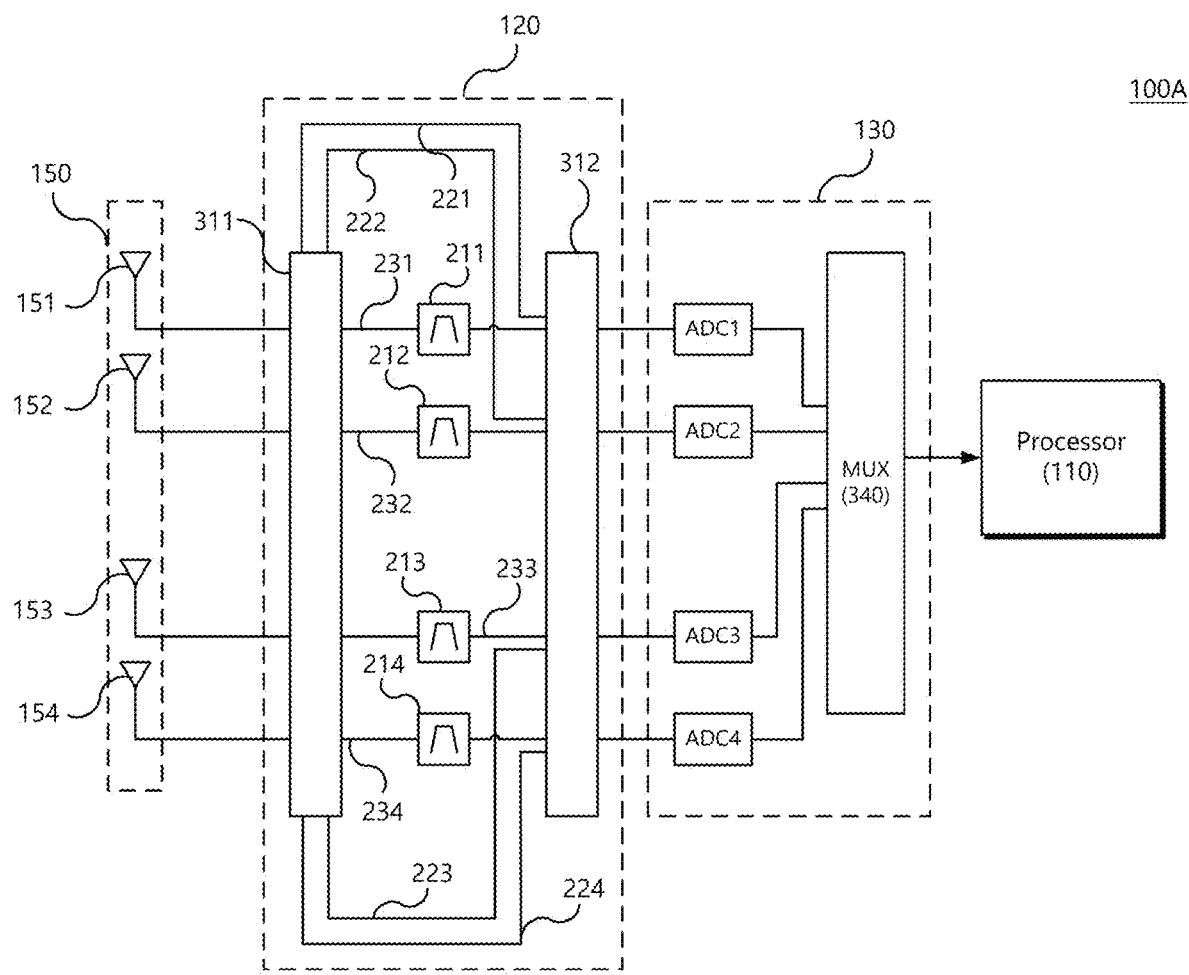

[FIG. 3]
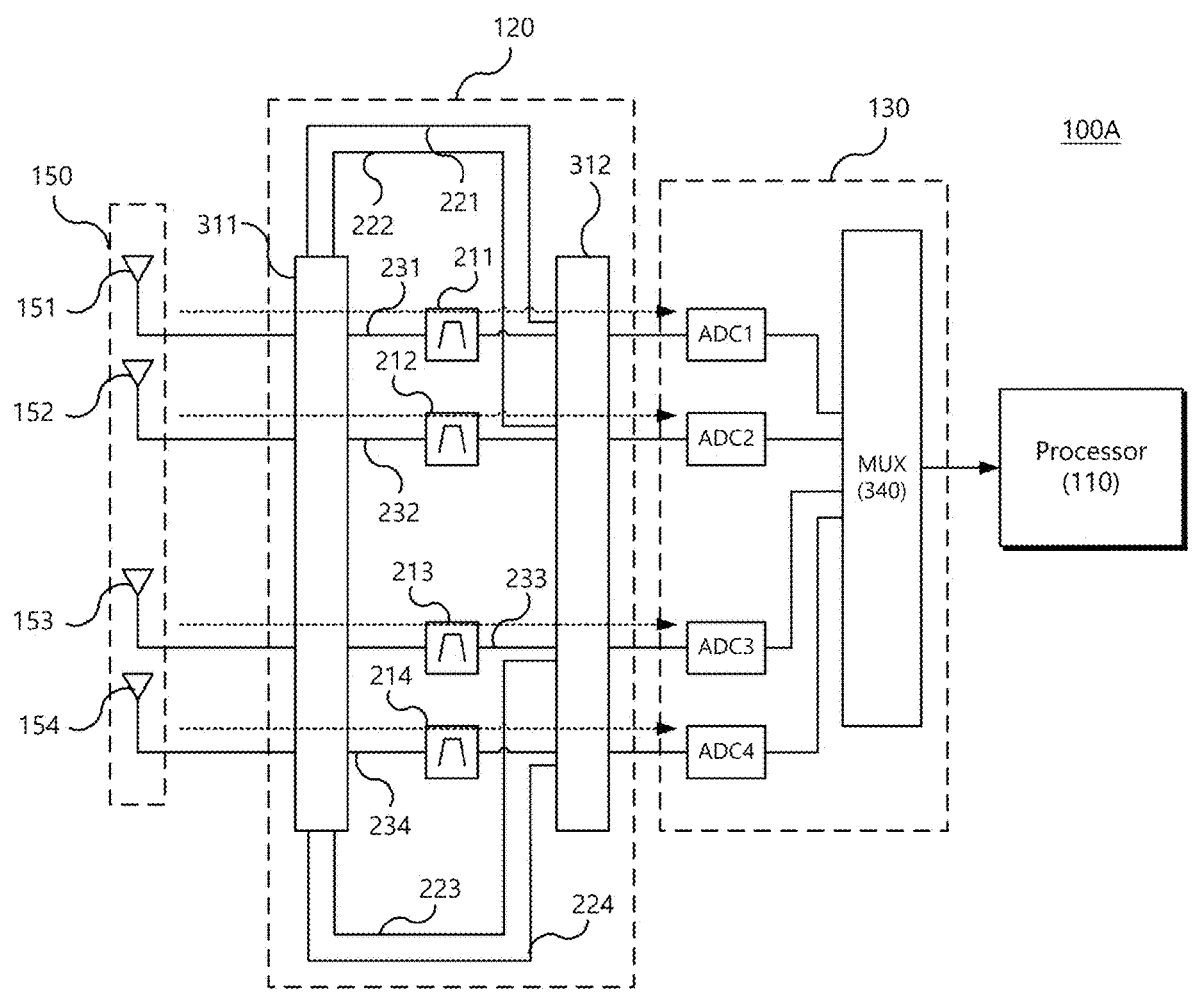

[FIG. 4A]
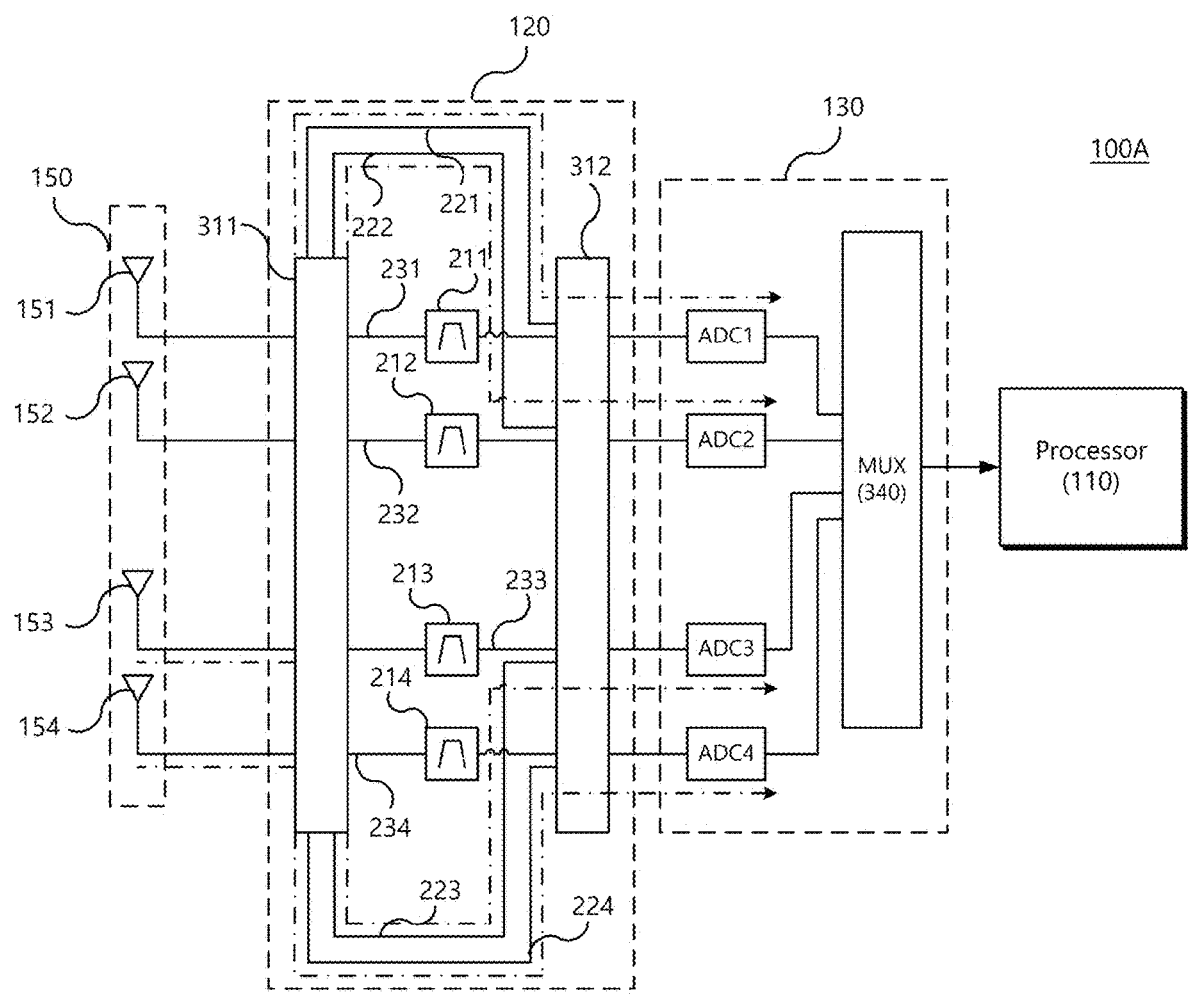

[FIG. 4B]
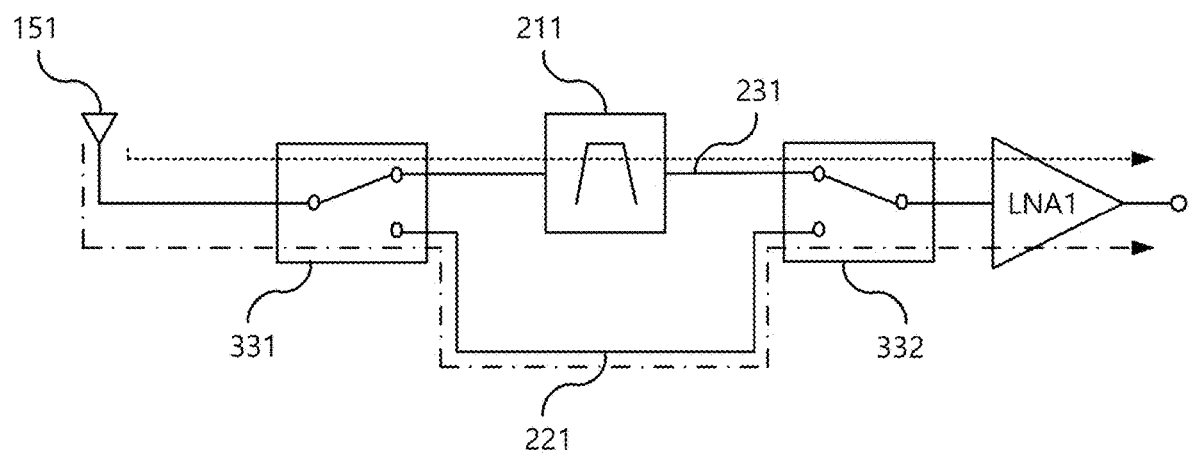

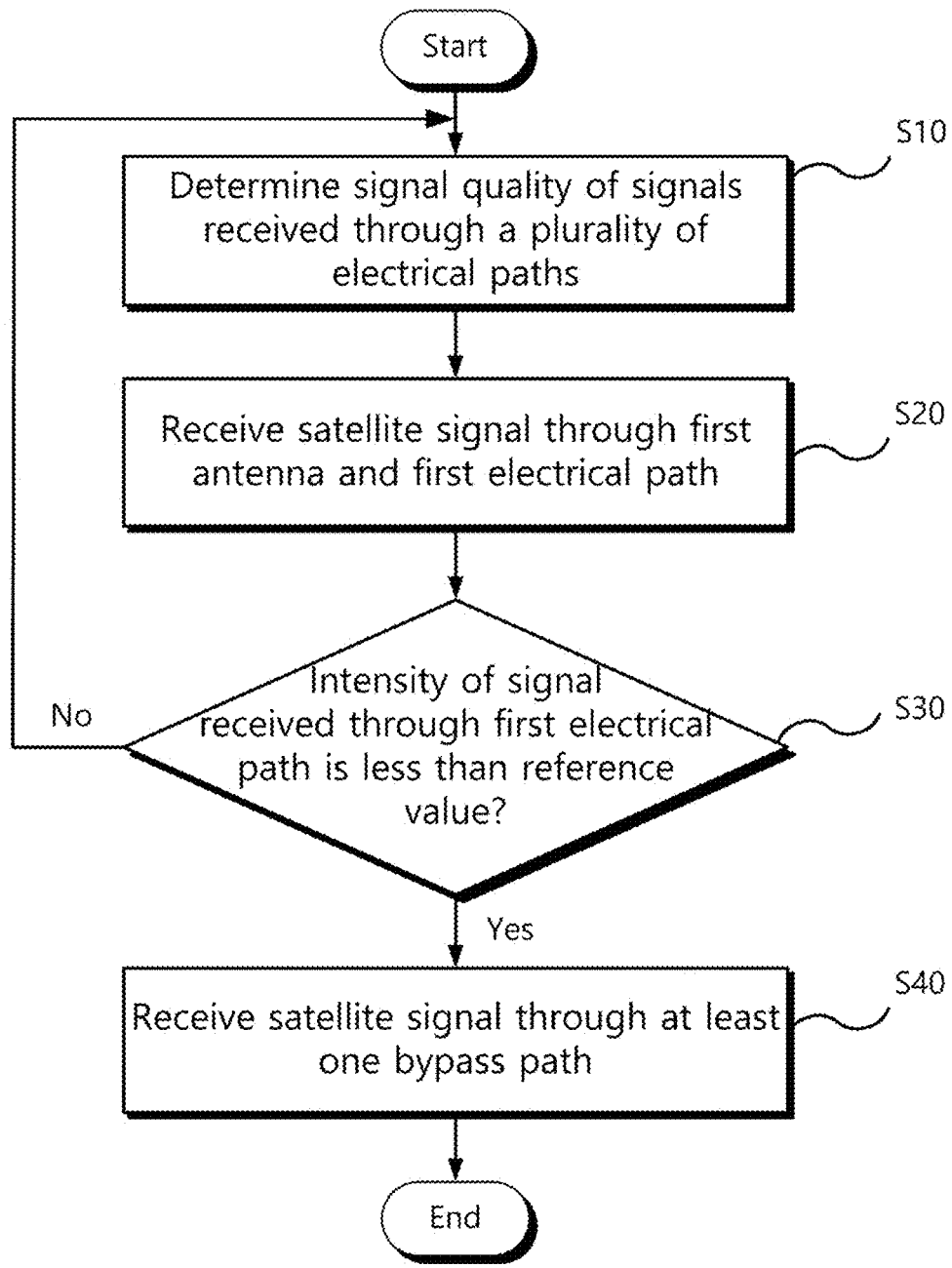
[FIG. 5]

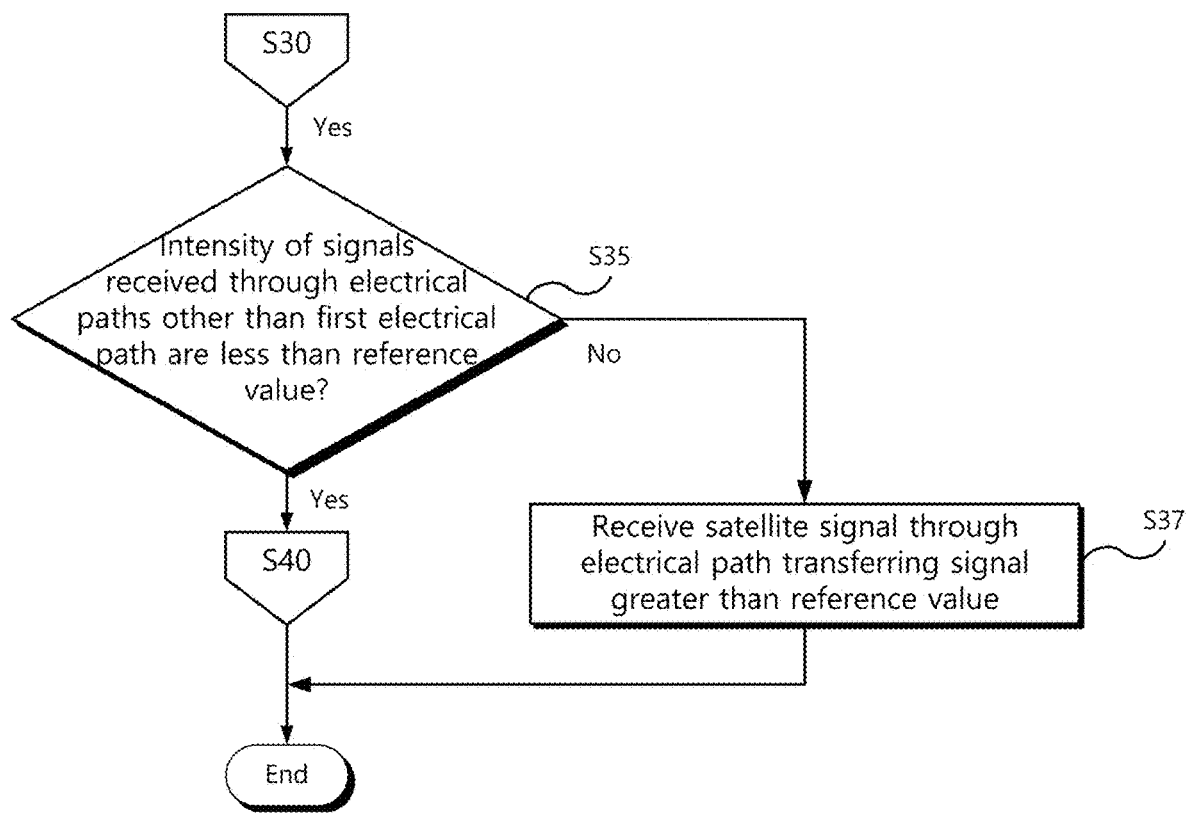
[FIG. 6]

[FIG. 7A]
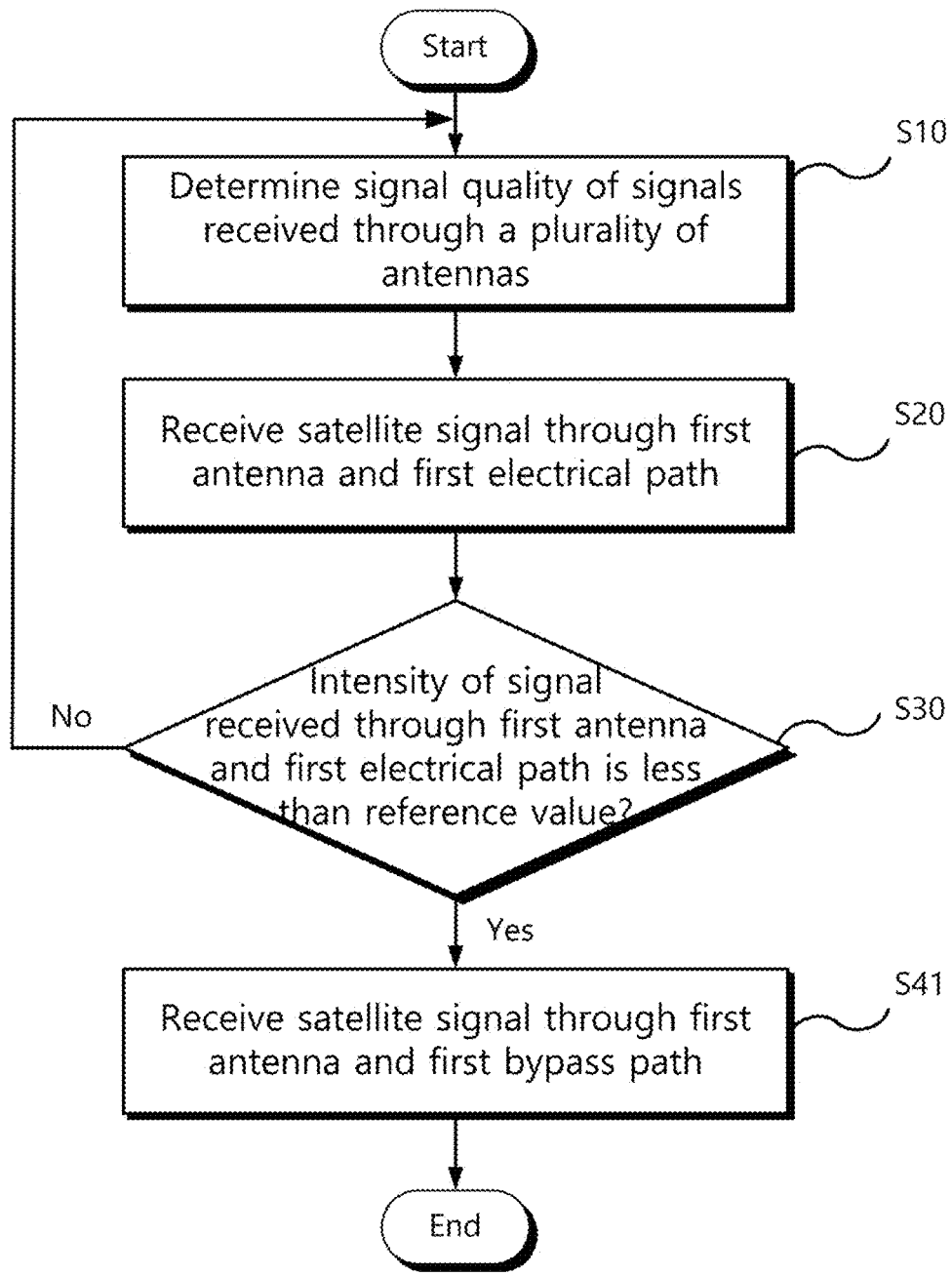

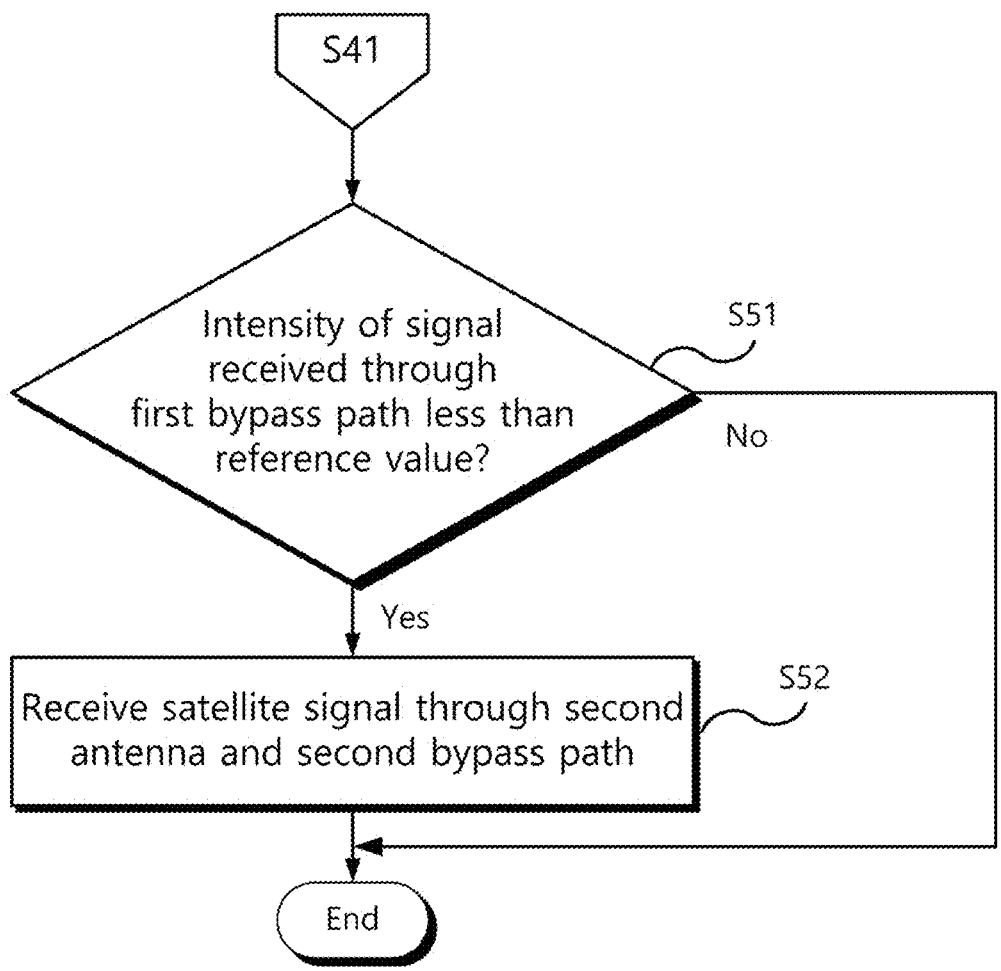
[FIG. 7B]

[FIG. 8]
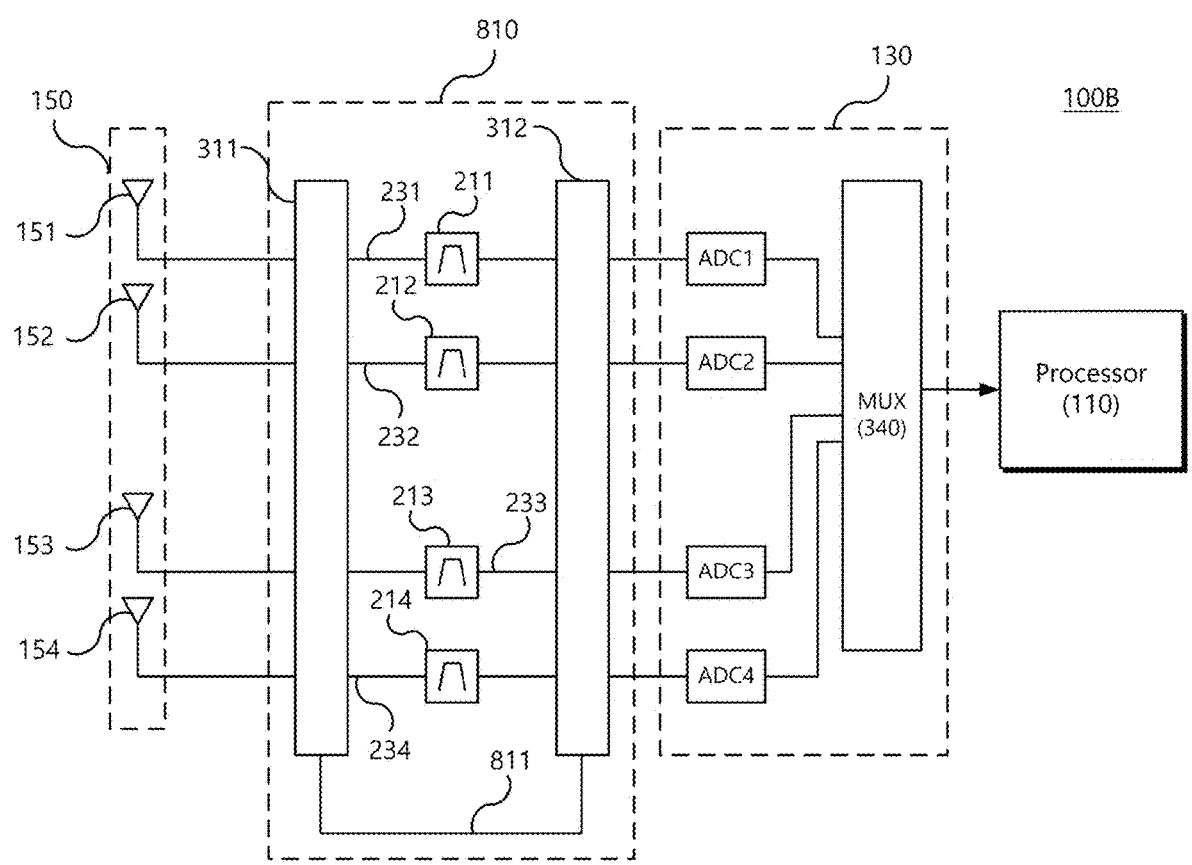

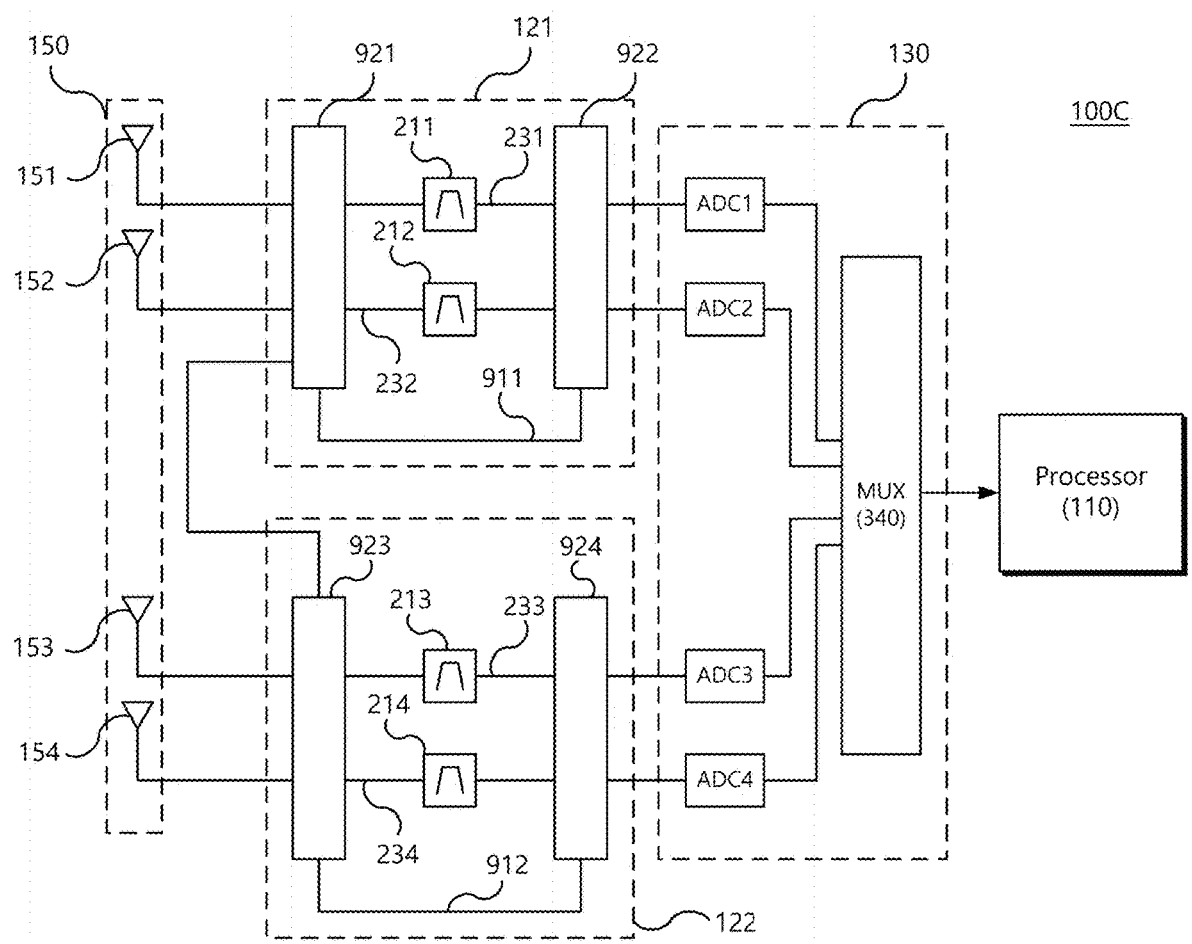
[FIG. 9]

ELECTRONIC DEVICE INCLUDING PLURALITY OF ANTENNAS AND WIRELESS COMMUNICATION METHOD USING THE SAME

CROSS-REFERENCE TO RELATED APPLICATIONS

This application claims priority under 35 U.S.C. § 119 to Korean Patent Application Nos. 10-2023-0065668 filed on May 22, 2023, and 10-2023-0098523 filed on Jul. 27, 2023, in the Korean Intellectual Property Office, the disclosures of which are incorporated by reference herein in their entireties.

BACKGROUND

Embodiments of the present disclosure described herein relate to an electronic device including a plurality of antennas and a wireless communication method using the same.

The Internet is evolving from a human-centered network where humans create and consume information to an Internet of Things (IoT) network that exchanges and processes information between distributed components such as things (e.g., appliances, vehicles, etc.).

In detail, the Internet of Things (IoT) is receiving great attention from telecommunication service providers and terminal manufacturers. Accordingly, standards organizations such as a 3rd Generation Partnership Project (3GPP) are standardizing communication technology for the IoT.

For example, a release-13 of the 3GPP standardizes a Cat-M1 and a NarrowBand Internet of Things (NB-IoT). In addition, a release-17 of the 3GPP standardizes 5G NB-IoT (or NR for NTN) to support non-terrestrial networks by installing satellite communication in smartphones, etc.

SUMMARY

Embodiments of the present disclosure provide an electronic device that receives a satellite signal through an electrical path or a bypass path connected to a plurality of antennas, based on a reception state of the satellite signal.

According to embodiments of the present disclosure, an electronic device includes a plurality of antennas, each of the plurality of antennas being configured to receive a satellite signal from a satellite, a plurality of electrical paths connected to the plurality of antennas, each of the plurality of electrical paths including a band pass filter configured to pass a signal of a corresponding frequency band, at least one bypass path connected in parallel with the plurality of electrical paths and connected to the plurality of antennas, and processing circuitry connected to the plurality of electrical paths and the at least one bypass path, the processing circuitry being configured to receive the satellite signal through a first antenna and a first electrical path based on a quality of a signal received through the first electrical path connected to the first antenna being highest among qualities of respective signals received through the plurality of electrical paths, the plurality of electrical paths including the first electrical path, and the plurality of antennas including the first antenna, and receive the satellite signal through one of the plurality of antennas and the at least one bypass path based on an intensity of a signal received through the first electrical path being less than a reference value.

According to embodiments of the present disclosure, a wireless communication method using a plurality of antennas includes determining a quality of each of a plurality of signals respectively received through a plurality of electrical paths, the plurality of electrical paths being connected to each of the plurality of antennas, receiving a satellite signal through a first antenna and a first electrical path in response to determining that the quality of a signal received through the first electrical path connected to the first antenna is highest among the qualities of respective signals received through the plurality of electrical paths, the plurality of electrical paths including the first electrical path, the plurality of antennas including the first antenna, the plurality of signals including the signal and the respective signals, and the first electrical path including a first band pass filter configured to pass a signal of a corresponding frequency band, and receiving the satellite signal through at least one bypass path connected in parallel with the plurality of electrical paths based on an intensity of a signal received through the first electrical path being less than a reference value.

According to embodiments of the present disclosure, an antenna device includes a first antenna configured to receive a satellite signal from a satellite, a first electrical path connected to the first antenna, the first electrical path including a first band pass filter configured to pass a signal of a corresponding frequency band, a first bypass path connected to the first antenna in parallel with the first electrical path, and processing circuitry connected to the first electrical path and the first bypass path, the processing circuitry being configured to receive the satellite signal through the first antenna and the first bypass path based on an intensity of a signal received through the first antenna and the first electrical path being less than a reference value.

BRIEF DESCRIPTION OF THE FIGURES

The above and other objects and features of the present disclosure will become apparent by describing in detail embodiments thereof with reference to the accompanying drawings.

FIG. 1 is a block diagram illustrating an electronic device communicating with a satellite, according to embodiments of the present disclosure.

FIG. 2 is a circuit diagram illustrating an example of an electronic device of FIG. 1.

FIG. 3 illustrates a configuration in which an electronic device of FIG. 2 receives a satellite signal through an electrical path.

FIG. 4A illustrates a configuration in which the electronic device of FIG. 2 receives a satellite signal through a bypass path connected to each antenna.

FIG. 4B illustrates a first electrical path and a first bypass path connected to a first antenna in the electronic device of FIG. 2.

FIG. 5 is a flowchart illustrating an operation in which an electronic device receives a satellite signal through an electrical path or at least one bypass path connected to an antenna, according to embodiments.

FIG. 6 is a flowchart illustrating an operation in which an electronic device receives a satellite signal through at least one bypass path, according to embodiments.

FIG. 7A is a flowchart illustrating an operation in which an electronic device receives a satellite signal through a first bypass path, according to embodiments.

FIG. 7B is a flowchart illustrating an operation in which the electronic device of FIG. 7A receives a satellite signal through a second bypass path.

FIG. 8 is a circuit diagram of an electronic device 100B according to embodiments.

FIG. 9 is a circuit diagram of an electronic device 100C according to embodiments.

DETAILED DESCRIPTION

Hereinafter, embodiments of the present disclosure may be described in detail and clearly to such an extent that one of ordinary skill in the art easily implements the present disclosure.

FIG. 1 is a block diagram illustrating an electronic device communicating with a satellite, according to embodiments of the present disclosure.

Referring to FIG. 1, according to embodiments, an electronic device 100 that communicates with a satellite 20 may include a plurality of antennas 150, a radio frequency front end (RFFE) 120, a radio frequency integrated circuit (RFIC) 130, and/or a processor 110.

The electronic device 100 according to embodiments disclosed in the present disclosure may be of various types. The electronic device 100 may include, for example, a portable communication device (e.g., a smartphone), a computer device, a portable multimedia device, a portable medical device, a camera, a wearable device, and/or a home appliance device. However, the electronic device 100 according to embodiments of the present disclosure is not limited to the above-described devices.

According to embodiments, the electronic device 100 may include the processor 110 connected to the plurality of antennas 150 through the RFFE 120 and the RFIC 130.

The processor 110 may control at least one other component (e.g., the RFFE 120 and/or the RFIC 130) of the electronic device 100 by, for example, executing software (or a program), and may perform a variety of data processing or calculations. The processor 110 may include a central processing unit or a microprocessor, and may control the overall operation of the electronic device 100. Accordingly, operations performed by the electronic device 100 below may be understood as being performed under the control of the processor 110.

According to embodiments, the processor 110 may support establishment of a communication channel in a band (about 6 GHz to about 30 GHz) to be used for wireless communication with the satellite 20, and network communication through the established communication channel. In detail, the processor 110 may support a satellite communication protocol with the satellite 20.

In this case, the wireless communication with the satellite 20 may be referred to as communication in a non-terrestrial network (NTN). For example, the wireless communication with the satellite 20 may be referred to as communication in the non-terrestrial network defined by the 3GPP.

Furthermore, the processor 110 may support the narrow band Internet of Things (NB-IoT) protocol using satellite communication in the non-terrestrial network (NTN). For example, the processor 110 may support the NB-IoT protocol using a signal with a designated frequency bandwidth (e.g., about 200 KHz) among signals received from the satellite 20.

According to embodiments, the processor 110 may support establishment of a communication channel in a band (e.g., about 6 GHz to about 60 Hz) to be used for wireless communication with an external network, and 5G network communication through the established communication channel. In this case, the external network may be a 5G network defined by the 3GPP. In addition, in this case, the 5G network may be named as (e.g., may be a) new radio (NR) network. Accordingly, the processor 110 may support the NR communication protocol.

According to embodiments, the processor 110 may support establishment of a communication channel corresponding to another designated band (e.g., about 6 GHz or less) among the bands to be used for wireless communication with an external network, and 5G network communication through the established communication channel.

According to embodiments, the processor 110 may support establishment of a communication channel in a band to be used for wireless communication with an external network, and legacy network communication through the established communication channel. In this case, the external network may be a legacy network including second generation (2G), 3G, 4G, and/or long term evolution (LTE) network. Accordingly, the processor 110 may support an LTE protocol.

The types and frequency bands of network communication supported by the processor 110 are not limited to the above description. However, a description below assumes that the processor 110 supports communication with the satellite 20 in a non-terrestrial network (NTN).

The electronic device 100 may include the plurality of antennas 150 that receive signals in a designated frequency band from the satellite 20. For example, the electronic device 100 may include an antenna array including the plurality of antennas 150. Accordingly, the electronic device 100 according to the present disclosure may be referred to as an antenna device including the plurality of antennas 150. According to embodiments, at least two among the plurality of antennas 150 have differing reception sensitivities.

For example, the electronic device 100 may include the plurality of antennas 150 implemented through at least a portion of a housing of the electronic device 100.

For another example, the electronic device 100 may include the plurality of antennas 150 formed in a specified pattern inside the electronic device 100 through a laser directed structure (LDS) process.

As another example, the electronic device 100 may include the plurality of antennas 150 implemented in the form of a patch. In this case, the plurality of antennas 150 may be formed with specified spacing and arrangement. Through this, the plurality of antennas 150 may perform a beamforming operation to implement (e.g., generate) a signal with a specified phase in the form of a beam.

However, the types and configurations of the plurality of antennas 150 according to the present disclosure are not limited to the above-described examples, and may be referred to as antennas of various types and configurations that may transmit and receive signals for wireless communication with the satellite 20 (or a base station).

In addition, the electronic device 100 may include the RFFE 120 connected to the plurality of antennas 150.

The RFFE 120 according to embodiments may include at least a portion of a phase shifter, a band pass filter, and/or a switching circuit, which are connected to the plurality of antennas 150. In addition, the RFFE 120 may include a plurality of paths for connecting each of the plurality of antennas 150 to the RFIC 130 or the processor 110. According to embodiments, the term "path" as used herein may refer to at least a portion of an electrical circuit over which signals may travel from an origination to a destination.

According to embodiments, the electronic device 100 may perform pre-processing (or processing) on signals received through the plurality of antennas 150 using the RFFE 120. For example, the electronic device 100 may use the RFFE 120 to pre-process (or process) radio frequency (RF) signals received through the plurality of antennas 150.

In more detail, the processor 110 may include an algorithm for controlling the RFFE 120. For example, the algorithm may be software code programmed inside the processor 110. As another example, the algorithm may be hard coded inside the processor 110, but embodiments are not limited thereto.

The processor 110 may control the RFFE 120 according to an algorithm to maximize (or increase) the quality of signals transmitted and/or received through the plurality of antennas 150.

In addition, the electronic device 100 may include the RFIC 130 connected between the RFFE 120 and the processor 110. In more detail, the electronic device 100 may include the RFIC 130 that converts a baseband signal into an RF signal or converts the RF signal into the baseband signal.

For example, when receiving, the RFIC 130 may convert the RF signal pre-processed (or processed) through the RFFE 120 into a baseband signal to be processed by the processor 110.

In addition, for example, when transmitting, the RFIC 130 may convert the baseband signal generated by the processor 110 into an RF signal of approximately 6 GHz or higher used in a first network (e.g., an NTN network).

As another example, when transmitting, the RFIC 130 may convert the baseband signal generated by the processor 110 into an RF signal of about 700 MHz to about 3 GHz used in a second network (e.g., a legacy network).

For another example, when transmitting, the RFIC 130 may convert the baseband signal generated by the processor 110 into an RF signal in the Sub6 band (about 6 GHz or less) used in a third network (e.g., a 5G network).

As another example, when transmitting, the RFIC 130 may convert the baseband signal generated by the processor 110 into an RF signal in the 5G Above5 band (e.g., about 6 GHz to about 60 GHz) used in a fourth network (e.g., the 5G network).

According to embodiments, the RFFE 120 and the RFIC 130 may be implemented as a single chip (e.g., only one chip) or at least part of a single package (e.g., at least a part of only one package).

Referring to the above-described configurations, the electronic device 100 according to the present disclosure may perform wireless communication with the satellite 20 through the non-terrestrial network.

Through this, the electronic device 100 may support the NB-IoT protocol using at least some of the signals received from the satellite 20.

FIG. 2 is a circuit diagram illustrating an example of an electronic device of FIG. 1.

Referring to FIG. 2, an electronic device 100A according to embodiments may include a plurality of electrical paths 231, 232, 233, and 234, and a plurality of bypass paths 221, 222, 223, and 224, which are connected to each of the plurality of antennas 150. According to embodiments, the plurality of bypass paths 221, 222, 223, and 224 do not include a band pass filter.

In more detail, the RFFE 120 according to embodiments may include the plurality of electrical paths 231, 232, 233, and 234 connected to (e.g., respectively connected to) each of the plurality of antennas 150.

For example, the RFFE 120 may include the first electrical path 231 connected to a first antenna 151. In addition, the RFFE 120 may include the second electrical path 232 connected to a second antenna 152. In addition, the RFFE 120 may include the third electrical path 233 connected to a third antenna 153. In addition, the RFFE 120 may include the fourth electrical path 234 connected to a fourth antenna 154.

According to embodiments, the plurality of electrical paths 231, 232, 233, and 234 may include band pass filters 211, 212, 213, and 214, respectively, that pass a signal in a designated frequency band. In this case, for example, the band pass filters 211, 212, 213, or 214 may each be referred to as a surface acoustic wave (SAW) filter that passes signals in a designated frequency band using electromagnetic waves, but embodiments are not limited thereto.

In more detail, the first electrical path 231 may include the first band pass filter 211 that passes signals in a designated frequency band. In addition, the second electrical path 232 may include the second band pass filter 212 that passes signals in a designated frequency band. In addition, the third electrical path 233 may include the third band pass filter 213 that passes signals in a designated frequency band. In addition, the fourth electrical path 234 may include the fourth band pass filter 214 that passes signals in a designated frequency band. According to embodiments, at least two among the first band pass filter 211, the second band pass filter 212, the third band pass filter 213 and the fourth band pass filter 214 may pass signals in the same designated frequency band or similar designated frequency bands. According to embodiments, at least two among the first band pass filter 211, the second band pass filter 212, the third band pass filter 213 and the fourth band pass filter 214 may pass signals in different designated frequency bands.

According to embodiments, the RFFE 120 may include a single band pass filter (e.g., only one band pass filter) connected to the plurality of electrical paths 231, 232, 233, and 234. In this case, the RFFE 120 may further include a switch that connects (e.g., selectively connects) one of the plurality of electrical paths 231, 232, 233, and 234 (e.g., one among the plurality of electrical paths 231, 232, 233, and 234 at a time) to the single band pass filter.

Using the above-described configurations, the electronic device 100A may obtain a signal with a designated frequency bandwidth (e.g., about 200 KHz) from among the received satellite signals. Through this, the electronic device 100A according to the present disclosure may support the NB-IoT protocol using a signal with a designated frequency bandwidth.

The RFFE 120 may include the plurality of bypass paths 221, 222, 223, and 224 connected (e.g., respectively connected) to the plurality of antennas 150. In more detail, the RFFE 120 may include the plurality of bypass paths 221, 222, 223, and 224 connected (e.g., respectively connected) to the plurality of antennas 150 and connected (e.g., respectively connected) to the plurality of electrical paths 231, 232, 233, and 234.

According to embodiments, the RFFE 120 may include a single bypass path (e.g., only one bypass path) connected in parallel with the plurality of electrical paths 231, 232, 233, and 234. However, a detailed description of this will be provided later in the description of FIG. 8 below.

The plurality of bypass paths 221, 222, 223, and 224 may be connected in parallel with the plurality of electrical paths 231, 232, 233, and 234, respectively. The plurality of bypass paths 221, 222, 223, and 224 may be connected to the plurality of antennas 150 in parallel with the plurality of electrical paths 231, 232, 233, and 234.

For example, the first bypass path 221 may be connected to the first antenna 151 in parallel with the first electrical path 231. In addition, the second bypass path 222 may be connected to the second antenna 152 in parallel with the second electrical path 232. In addition, the third bypass path 223 may be connected to the third antenna 153 in parallel with the third electrical path 233. In addition, the fourth bypass path 224 may be connected to the fourth antenna 154 in parallel with the fourth electrical path 234.

According to embodiments, the RFFE 120 may include a first switching circuit 311 that selectively connects each of the plurality of antennas 150 to the plurality of electrical paths 231, 232, 233, and 234 or the plurality of bypass paths 221, 222, 223, and 224.

According to an embodiment, the processor 110 may control the first switching circuit 311 to connect each of the plurality of antennas 150 to the plurality of electrical paths 231, 232, 233, and 234 or the plurality of bypass paths 221, 222, 223, and 224.

For example, the processor 110 may control the first switching circuit 311 to connect the first antenna 151 to the first electrical path 231 or the first bypass path 221. In addition, the processor 110 may control the first switching circuit 311 to connect the second antenna 152 to the second electrical path 232 or the second bypass path 222. In addition, the processor 110 may control the first switching circuit 311 to connect the third antenna 153 to the third electrical path 233 or the third bypass path 223. In addition, the processor 110 may control the first switching circuit 311 to connect the fourth antenna 154 to the fourth electrical path 234 or the fourth bypass path 224.

In this case, for example, the first switching circuit 311 may be understood as a switching circuit including four single pole double throw (SPDT) switches, but embodiments are not limited thereto.

Referring to the above-described configurations, the electronic device 100A may include the plurality of bypass paths 221, 222, 223, and 224 connected to the plurality of antennas 150 in parallel with the plurality of electrical paths 231, 232, 233, and 234.

The signal transferred to the processor 110 through the plurality of bypass paths 221, 222, 223, and 224 may have a relatively high transmission gain compared to the signal transferred to the processor 110 through the plurality of electrical paths 231, 232, 233, and 234. In this case, the transmission gain may be referred to as corresponding to the loss due to the band pass filters 211, 212, 213, and 214 included in each of the plurality of electrical paths 231, 232, 233, and 234.

Accordingly, the electronic device 100A according to the present disclosure may receive a satellite signal from the satellite 20 through the bypass path when the intensity of signals received through the electrical path decreases or signals are not received. According to embodiments, the term "intensity" as used herein may refer to, for example, at least one of signal gain, signal magnitude and/or signal voltage.

In this case, for example, the satellite signal is transferred from the satellite 20 and may be referred to as a signal having a frequency band of about 6 GHz or more, but embodiments are not limited thereto.

Through this, the electronic device 100A according to the present disclosure may improve the sensitivity of the received signal when communicating with the satellite 20.

In addition, the RFFE 120 may include a second switching circuit 312 that selectively connects the RFIC 130 to the plurality of electrical paths 231, 232, 233, and 234 or the plurality of bypass paths 221, 222, 223, and 224.

For example, the processor 110 may control the second switching circuit 312 to connect the first bypass path 221 to a first analog-to-digital converter (ADC) (ADC1) of the RFIC 130. In addition, the processor 110 may control the second switching circuit 312 to connect the second electrical path 232 to a second ADC (ADC2) of the RFIC 130.

For example, the second switching circuit 312 may be referred to as a switching circuit including four double pole single throw (DPST) switches, but is not limited thereto.

According to embodiments, the RFIC 130 may include a plurality of analog-to-digital converters (ADCs) and a multiplexer (MUX) 340.

The RFIC 130 may include a plurality of ADCs (ADC1, ADC2, ADC3, and ADC4) that convert an analog signal transferred from the RFFE 120 into a digital signal. For example, the RFIC 130 may include the first ADC (ADC1) connected to the first electrical path 231 and the first bypass path 221. In addition, the RFIC 130 may include the second ADC (ADC2) connected to the second electrical path 232 and the second bypass path 222. In addition, the RFIC 130 may include the third ADC (ADC3) connected to the third electrical path 233 and the third bypass path 223. In addition, the RFIC 130 may include the fourth ADC (ADC4) connected to the fourth electrical path 234 and the fourth bypass path 224.

According to embodiments, the RFIC 130 may include a single ADC (e.g., only one ADC) connected to the RFFE 120. In this case, the RFIC 130 may further include a switch that connects (e.g., selectively connects) one of the plurality of electrical paths 231, 232, 233, and 234 and the plurality of bypass paths 221, 222, 223, and 224 (e.g., one among the plurality of electrical paths 231, 232, 233, and 234, and the plurality of bypass paths 221, 222, 223, and 224, at a time) to a single ADC.

In addition, the RFIC 130 may include the multiplexer 340 connected to the plurality of ADCs.

The processor 110 may control the multiplexer 340 to receive at least some of the signals transferred from the RFFE 120. For example, the processor 110 may control the multiplexer 340 to receive a signal transferred from the first antenna 151 among signals transferred from the RFFE 120.

Referring to the above-described configurations, the electronic device 100A according to embodiments may include a plurality of paths for transferring signals received through each antenna to the processor 110. In addition, the processor 110 may selectively receive signals transferred from the plurality of paths.

Accordingly, the electronic device 100A may receive a satellite signal from the satellite 20 using an antenna and an electrical path that receive a signal with the highest (or having a higher) signal quality (e.g., a highest signal quality value, metric, etc.).

In addition, when the quality of a signal received from a specific antenna and an electrical path connected to the specific antenna deteriorates, the electronic device 100A may receive a satellite signal through another antenna and an electrical path connected to the other antenna. For example, when the quality of the signal received from the first antenna 151 and the first electrical path 231 deteriorates, the electronic device 100A may receive a satellite signal through the second antenna 152 and the second electrical path 232.

Through this, the electronic device 100A according to the present disclosure may improve signal reception sensitivity when communicating with the satellite 20.

FIG. 3 illustrates a configuration in which an electronic device of FIG. 2 receives a satellite signal through an electrical path.

Referring to FIG. 3, the processor 110 according to embodiments may receive a satellite signal transferred from the satellite 20 using one of the plurality of electrical paths 231, 232, 233, and 234.

However, the same reference numerals are used for components that are identical, actually the same as or similar to the above-described components, and descriptions that overlap with the above-described description are omitted to avoid redundancy.

In more detail, the processor 110 may receive a satellite signal transferred from the satellite 20 through one of the plurality of antennas 150 and an electrical path connected to the corresponding antenna.

According to embodiments, the processor 110 may determine the quality of signals received from the plurality of electrical paths 231, 232, 233, and 234. In more detail, the processor 110 may determine the quality of signals based on parameters measured from signals received from the plurality of electrical paths 231, 232, 233, and 234.

For example, the processor 110 may measure at least one of a reference signal received power (RSRP), a reference signal received quality (RSRQ), a signal to noise ratio (SNR), a received signal strength indicator (RSSI), and/or a signal to interference plus noise ratio (SINR) of signals received from the plurality of electrical paths 231, 232, 233, and 234. However, the parameters related to the signal quality are not limited to the above-described examples.

Furthermore, the processor 110 may determine the quality of the signal based on the parameters of the measured signal.

The processor 110 may receive a satellite signal through one of the plurality of electrical paths 231, 232, 233, and 234, based on the quality of the signals. In more detail, the processor 110 may receive the satellite signal through an electrical path that transfers a signal with the highest signal quality.

For example, when the quality of the signal received through the first electrical path 231 is the highest quality, the processor 110 may receive the satellite signal through the first antenna 151 and the first electrical path 231.

Referring to the above-described configurations, the processor 110 may receive a satellite signal through an electrical path transferring the highest quality signal among the plurality of electrical paths 231, 232, 233, and 234 and the antenna connected to the corresponding electrical path.

Through this, the electronic device 100A according to the present disclosure may improve signal reception sensitivity when communicating with the satellite 20.

FIG. 4A illustrates a configuration in which the electronic device of FIG. 2 receives a satellite signal through a bypass path connected to each antenna. FIG. 4B illustrates a first electrical path and a first bypass path connected to a first antenna in the electronic device of FIG. 2.

Referring to FIGS. 4A and 4B together, the processor 110 according to embodiments may receive the satellite signal through at least one bypass path in response to the intensity of the signal received through the electrical path being less than a preset (or alternatively, given) reference value.

However, the same reference numerals are used for components that are identical, actually the same as or similar to the above-described components, and descriptions that overlap with the above-described description are omitted to avoid redundancy.

Referring to FIG. 4A, the electronic device 100A according to embodiments may include the plurality of bypass paths 221, 222, 223, and 224 connected to the plurality of antennas 150.

In more detail, the electronic device 100A may include the plurality of bypass paths 221, 222, 223, and 224 connected to the plurality of antennas 150 and the plurality of electrical paths 231, 232, 233, and 234.

According to embodiments, the plurality of bypass paths 221, 222, 223, and 224 may be connected in parallel with the plurality of electrical paths 231, 232, 233, and 234. In more detail, the plurality of bypass paths 221, 222, 223, and 224 may be connected to the plurality of antennas 150 in parallel with the plurality of electrical paths 231, 232, 233, and 234.

According to embodiments, the processor 110 may receive the satellite signal through some of the plurality of bypass paths 221, 222, 223, and 224.

In more detail, in response to the intensity of signals received from the plurality of electrical paths 231, 232, 233, and 234 being less than the preset (or alternatively, given) reference value, the processor 110 may receive the satellite signal through some of the plurality of bypass paths 221, 222, 223, and 224.

In this case, for example, when the intensity of a signal received through a specific electrical path is less than the reference value, it may be understood as a case where the communication connection with the satellite 20 through the electrical path is disconnected.

In other words, the fact that the intensity of the signal received through a specific electrical path is less than the reference value may be understood as not receiving a signal having the intensity necessary (or sufficient) for communication (e.g., reliable and/or higher quality communication) with the satellite 20 through the corresponding electrical path.

For example, when the intensity of each signal received from the first to fourth electrical paths 231 to 234 is less than the reference value, the processor 110 may receive the satellite signal through the second antenna 152 and the second bypass path 222.

For another example, the processor 110 may receive the satellite signal through the first antenna 151 and the first bypass path 221 in response to the intensity of the signal received through the first antenna 151 and the first electrical path 231 being less than the reference value.

In more detail, referring to FIG. 4B, the electronic device 100A according to embodiments may include a first switch 331 that selectively connects the first antenna 151 to the first electrical path 231 or the first bypass path 221.

In addition, the electronic device 100A may include a first amplifier LNA1 (e.g., a low-noise amplifier LNA1) that amplifies the signal transferred from the first electrical path 231 or the first bypass path 221 and transfers the amplified signal to the processor 110.

In addition, the electronic device 100A may include a second switch 332 that selectively connects the first amplifier LNA1 to the first electrical path 231 or the first bypass path 221.

In this case, for example, the first switch 331 and the second switch 332 may be referred to (e.g., may each be implemented) as a single pole double throw (SPDT) switch, but embodiments are not limited thereto.

According to embodiments, the first switch 331 may be included in the first switching circuit 311. In addition, the second switch 332 may be included in the second switching circuit 312.

According to embodiments, while receiving a signal through the first electrical path 231, the processor 110 may control the first switch 331 and the second switch 332 in response to the intensity of the received signal being less than the preset (or alternatively, given) reference value.

In more detail, in response to the intensity of the signal received through the first electrical path 231 being less than the reference value, the processor 110 may connect the first antenna 151 to the first bypass path 221 through the first switch 331. In addition, the processor 110 may connect the first bypass path 221 to the first amplifier LNA1 through the second switch 332 in response to the intensity of the signal received through the first electrical path 231 being less than the reference value.

Through this, the processor 110 may receive the satellite signal through the first antenna 151 and the first bypass path 221.

In this case, the signal received through the first bypass path 221 may have a relatively high transmission gain compared to the signal received through the first electrical path 231.

For example, a signal received through the first bypass path 221 may have a transmission gain as high (or at least as high) as the loss due to the first band pass filter 211 of a signal received through the first electrical path 231.

Accordingly, when the intensity of the signal received through the first electrical path 231 decreases and the connection with the satellite 20 is lost, the processor 110 may receive the satellite signal through a bypass path with a relatively high transmission gain.

In detail, in communication with the satellite 20, the electronic device 100A according to the present disclosure may receive a signal through a bypass path that does not include a band pass filter when reception is not possible through an electrical path including a band pass filter (or when the intensity of a signal received through the electrical path including the band pass filter is less than a reference value, the reference value corresponding to a level of communication reliability and/or quality).

Through this, the electronic device 100A may improve signal reception sensitivity when communicating with the satellite 20.

FIG. 5 is a flowchart illustrating an operation in which an electronic device receives a satellite signal through an electrical path or at least one bypass path connected to an antenna, according to embodiments. An electronic device of FIG. 5 may be referred to as (e.g., may be) the same as (or similar to) the electronic device 100A of FIG. 2.

Referring to FIG. 5, the electronic device 100A (or the processor 110) according to embodiments may receive a satellite signal through an electrical path or at least one bypass path, based on the quality and/or intensity of the received signal.

In operation S10, the processor 110 may determine (or measure) the quality of signals received through the plurality of electrical paths 231, 232, 233, and 234.

For example, the processor 110 may monitor the quality of signals received through the plurality of electrical paths 231, 232, 233, and 234 in real time. For another example, the processor 110 may measure the quality of signals received through the plurality of electrical paths 231, 232, 233, and 234 during a preset (or alternatively, given) period.

In this case, for example, the quality of the signal (e.g., the signals received through the plurality of electrical paths 231, 232, 233, and 234 during the preset (or alternatively, given) period is determined by at least one of a reference signal received power (RSRP), a reference signal received quality (RSRQ), a signal to noise ratio (SNR), a received signal strength indicator (RSSI), and/or a signal to interference plus noise ratio (SINR).

Furthermore, in operation S10, the processor 110 may compare the signal quality of signals received through the plurality of electrical paths 231, 232, 233, and 234.

Based on the comparison result, the processor 110 may identify an electrical path transferring the signal of the highest quality among the plurality of electrical paths 231, 232, 233, and 234 and an antenna connected to the corresponding electrical path.

For example, the processor 110 may identify the first electrical path 231 that transfers the signal of the highest quality among the plurality of electrical paths 231, 232, 233, and 234, and the first antenna 151 connected to the first electrical path 231.

In operation S20, the processor 110 may receive a satellite signal through the first antenna 151 and the first electrical path 231. In more detail, the processor 110 may receive a satellite signal through the first antenna 151 and the first electrical path 231 when the quality of the signal received from the first electrical path 231 is the highest quality.

However, the content illustrated in FIG. 5 assumes that the quality of the signal received through the first antenna 151 and the first electrical path 231 is the highest quality, but the configuration of the present disclosure is not limited thereto.

According to another example, when the quality of the signal received from the third electrical path 233 is the highest quality, the processor 110 may receive the satellite signal through the third antenna 153 and the third electrical path 233.

In detail, the processor 110 may receive a satellite signal using an electrical path that transfers the signal of the highest quality among the plurality of electrical paths 231, 232, 233, and 234 and an antenna connected to the corresponding electrical path.

Through this, the electronic device 100A may improve the reception sensitivity of a signal received through an electrical path.

In operation S30, the processor 110 may determine whether the intensity of the signal received through the first electrical path 231 is less than a preset (or alternatively, given) reference value.

In this case, for example, the reference value may be understood as the minimum (or lowest) reception intensity required (or sufficient) for the electronic device 100A to communicate (e.g., reliable and/or higher quality communication) with the satellite 20. Therefore, when the intensity of the signal received through the first electrical path 231 is less than the reference value, it may be understood that the processor 110 may not communicate with the satellite 20 through the first electrical path 231.

If the intensity of the signal received through the first electrical path 231 is determined to be less than the preset (or alternatively, given) reference value (Yes in operation S30), in operation S40 the processor 110 may receive a satellite signal through the at least one bypass path 221, 222, 223, or 224. In this case, the at least one bypass path 221, 222, 223, or 224 may be connected in parallel with the plurality of electrical paths 231, 232, 233, or 234. If the intensity of the signal received through the first electrical path 231 is determined to be greater than or equal to the preset (or alternatively, given) reference value (No in operation S30), the processor 110 may return to and re-perform operation S10. According to embodiments, upon receiving the satellite signal, the processor 110 may perform at least one among demodulating, decoding, decrypting and/or filtering on the satellite signal. Also, according to embodiments, the processor 110 may generate an application signal and/or a control signal and provide the generated application signal and/or control signal to another component of the electronic device 100 (e.g., a speaker, a display, an actuator, etc.) to cause the other component to perform a corresponding function. According to embodiments, the processor 110 may generate a communication signal based on the satellite signal, and transmit the communication signal to the satellite 20 via the electronic device 100.

In more detail, when the intensity of the signal received through the first electrical path 231 is less than the reference value, the processor 110 may receive the satellite signal through the at least one bypass path 221, 222, 223, or 224.

For example, when the intensity of the signal received through the first electrical path 231 is less than the reference value, the satellite signal may be received through the first antenna 151 and the first bypass path 221.

For example, when the intensity of the signal received through the first electrical path 231 is less than the reference value, the satellite signal may be received through the second antenna 152 and the second bypass path 222.

According to embodiments, the plurality of electrical paths 231, 232, 233, and 234 may include the band pass filters 211, 212, 213, and 214 that pass signals in a designated frequency band, respectively. In contrast, the at least one bypass path 221, 222, 223, or 224 may not include a band pass filter.

Referring to the above-described configurations, the processor 110 may receive a satellite signal through a bypass path that does not include a band pass filter when the intensity of a signal received through an electrical path including a band pass filter is less than the reference value.

Through this, the electronic device 100A according to the present disclosure may use a bypass path to secure a link margin corresponding to the loss due to the band pass filter. Furthermore, the electronic device 100A may improve signal reception sensitivity when communicating with the satellite 20.

FIG. 6 is a flowchart illustrating an operation in which an electronic device receives a satellite signal through at least one bypass path, according to embodiments. An electronic device of FIG. 6 may be referred to as (e.g., may be) the same as (or similar to) the electronic device 100A of FIG. 2.

Referring to FIG. 6, the processor 110 according to embodiments may select a path for receiving a satellite signal based on the intensity of signals received from the plurality of electrical paths 231, 232, 233, and 234.

In operation S35, when the intensity of the signal received through the first electrical path 231 is less than the reference value (Yes in operation S30), the processor 110 may determine whether the intensity of the signals received through the electrical paths other than the first electrical path 231 (e.g., a subset of the electrical paths not including the first electrical path 231) is less than the reference value.

In more detail, when the intensity of the signal received through the first electrical path 231 is less than the reference value, the processor 110 may determine whether the respective intensity of each signal received through the second electrical path 232, the third electrical path 233, and the fourth electrical path 234 is less than the reference value.

In operation S37, the processor 110 may receive a satellite signal through an electrical path that transfers a signal with an intensity greater than or equal to the reference value among the electrical paths other than the first electrical path 231 and an antenna connected to the corresponding electrical path.

In more detail, when the intensity of a signal received from some of the electrical paths other than the first electrical path 231 is greater than or equal to the reference value (No in operation S35), the processor 110 may receive a satellite signal through an electrical path that transfers a signal greater than or equal to the reference value and an antenna connected to the corresponding electrical path in operation S37.

For example, when the intensity of the signal received through the second electrical path 232 is greater than or equal to the reference value, the processor 110 may receive the satellite signal through the second electrical path 232 and the second antenna 152 connected to the second electrical path 232.

For another example, when the intensity of the signal received through the second electrical path 232 and the third electrical path 233 is greater than or equal to the reference value, the processor 110 may receive the satellite signal through one of the second electrical path 232 and/or the third electrical path 233, and the antenna connected to the corresponding electrical path. According to embodiments, in such a scenario the processor 110 may select the one among the second electrical path 232 and/or the third electrical path 233 for which a higher signal quality was determined in operation S10.

In response to determining that the intensity of the signals received through the electrical paths other than the first electrical path 231 is less than the reference value (Yes in operation S35), in operation S40 the processor 110 may receive the satellite signal through at least one bypass path 221, 222, 223, or 224 connected in parallel with the plurality of electrical paths 231, 232, 233, and 234.

In more detail, the processor 110, when the intensity of the signals received from the plurality of electrical paths 231, 232, 233, and 234 are all less than the reference value, the processor 110 may receive the satellite signal through at least one bypass path 221, 222, 223, or 224.

Referring to the above-described configuration, when there is an electrical path transferring a signal greater than or equal to the reference value among the plurality of electrical paths 231, 232, 233, and 234, the processor 110 may receive the satellite signal through the corresponding electrical path.

In detail, the processor 110 may receive a signal having a designated frequency band and an intensity greater than a reference value through some of the electrical paths including the band pass filter.

In addition, referring to the above-described configuration, the processor 110 may receive the satellite signal through a bypass path that does not include the band pass filter when the intensity of the signals received from the plurality of electrical paths 231, 232, 233, and 234 are all less than the reference value.

Accordingly, when the reception sensitivity of a signal received through an electrical path decreases, the processor 110 may receive a satellite signal transferred from the satellite 20 through a bypass path with a relatively high transmission gain.

Through this, the electronic device 100A according to the present disclosure may improve signal reception sensitivity when communicating with the satellite 20.

FIG. 7A is a flowchart illustrating an operation in which an electronic device receives a satellite signal through a first bypass path, according to embodiments. FIG. 7B is a flowchart illustrating an operation in which the electronic device of FIG. 7A receives a satellite signal through a second bypass path. An electronic device of FIGS. 7A and 7B may be referred to as (e.g., may be) the same as (or similar to) the electronic device 100A of FIG. 2.

Referring to FIGS. 7A and 7B together, the processor 110 according to embodiments may receive a satellite signal through a designated bypass path based on the intensity of the signal received through the electrical path.

However, the same reference numerals are used for components that are identical, actually the same as or similar to the above-described components, and descriptions that overlap with the above-described description are omitted to avoid redundancy. For example, operations S10, S20 and/or S30 may be the same as or similar to those corresponding operations discussed in connection with FIGS. 5 and 6.

Referring to FIG. 7A, the processor 110 may receive a satellite signal through a bypass path connected to a specific antenna based on a preset (or alternatively, given) priority.

In operation S41, in response to determining that the intensity of the signal received through the first electrical path 231 is less than a preset (or alternatively, given) reference value (Yes in operation S30), the processor 110 may receive a satellite signal through the first bypass path 221.

In more detail, when the intensity of the signal received through the first electrical path 231 is less than the reference value, the processor 110 may receive a satellite signal through the first antenna 151 with the highest priority and the first bypass path 221, based on the preset (or alternatively, given) priority.

However, the content illustrated in FIG. 7A assumes that the first antenna 151 among the plurality of antennas 150 has the highest priority, but the configuration of the present disclosure is not limited thereto.

According to embodiments, when the intensity of the signal received through the first electrical path 231 is less than the reference value, the processor 110 may receive a satellite signal through the third antenna 153 with the highest priority and the third bypass path 223.

In detail, when the intensity of the signal received through the first electrical path 231 is less than the reference value, the processor 110 may receive a satellite signal through the antenna with the highest priority and a bypass path connected to the corresponding antenna, based on the preset (or alternatively, given) priority.

In this case, the priority may be set with respect to the plurality of antennas 150 or the plurality of bypass paths 221, 222, 223, and 224. In addition, data with respect to the preset (or alternatively, given) priority may be stored in a memory connected to the processor 110.

Referring to the above-described configurations, the processor 110 may receive the satellite signal through an antenna that may have the highest reception sensitivity among the plurality of antennas 150 and a bypass path connected to the corresponding antenna, based on a preset (or alternatively, given) priority. According to embodiments, for example, the priority stored in the memory may indicate that the first antenna 151 among the plurality of antennas 150 has the highest priority due to its having the highest reception sensitivity, and that the first bypass path 221 has the highest priority among the plurality of bypass paths 221, 222, 223, and 224 by virtue of its connection to the first antenna 151.

Through this, the electronic device 100A according to the present disclosure may prevent (or reduce) power consumption for determining the intensity of the signal received from each of the plurality of electrical paths 231, 232, 233, and 234. Accordingly, the electronic device 100A according to the present disclosure may reduce power consumed during communication with the satellite 20.

Referring to FIG. 7B, the processor 110 according to embodiments may receive a satellite signal through a bypass path that transfers a signal with an intensity greater than or equal to the reference value among the plurality of bypass paths 221, 222, 223, and 224.

In operation S51, after performance of operations S41, the processor 110 may determine whether the intensity of the signal received through the first bypass path 221 is less than a preset (or alternatively, given) reference value.

In more detail, the processor 110 may determine whether the intensity of the signal received through the first antenna 151 and the first bypass path 221 connected to the first antenna 151 is less than the reference value.

In operation S52, when the intensity of the signal received through the first bypass path 221 is less than the reference value (Yes in operation S51), the processor 110 may receive a satellite signal through the second antenna 152 and the second bypass path 222 connected to the second antenna 152. When the intensity of the signal received through the first bypass path 221 is greater than or equal to than the reference value (No in operation S51), operation S52 may be skipped.

In more detail, when the intensity of the signal received through the first bypass path 221 is less than the reference value, the processor 110 may receive a satellite signal through the second antenna 152 and the second bypass path 222 based on a preset (or alternatively, given) priority. In this case, the second antenna 152 may be understood to have priority after the first antenna 151.

In detail, when the intensity of the signal received through the first bypass path 221 is less than the reference value, the processor 110 may receive a satellite signal through an antenna with a priority after the first antenna 151 (e.g., directly below the priority of the first antenna 151) and a bypass path connected to the corresponding antenna, based on the preset (or alternatively, given) priority.

The configuration illustrated in FIG. 7B assumes that the first antenna 151 has the highest priority and the second antenna 152 has the next priority, but the priority according to the present disclosure is not limited thereto.

According to embodiments, when the intensity of the signal received through the first bypass path 221 is less than the reference value, the processor 110 may receive a satellite signal through a bypass path that transfers a signal greater than or equal to the reference value among the bypass paths 222, 223, and 224 other than the first bypass path 221 and an antenna connected to the corresponding bypass path.

According to embodiments, the electronic device 100A (or the RFFE 120) may include a single bypass path (e.g., only one bypass path) connected to the plurality of antennas 150. In this case, when the intensity of the signal received through the first antenna 151 and the bypass path is less than the reference value, the processor 110 may receive a satellite signal through the second antenna 152 and a bypass path. According to embodiments, for example, when the intensity of the signal received through the first antenna 151 and the single bypass path is less than the reference value, the processor 110 may receive a satellite signal through the second antenna 152 and the signal bypass path.

Referring to the above-described configurations, when the reception sensitivity of a signal received through a specific bypass path decreases, the processor 110 may receive the satellite signal transferred from the satellite 20 through some (e.g., at least one) of the bypass paths other than the corresponding bypass path.

Through this, the electronic device 100A according to the present disclosure may improve signal reception sensitivity when communicating with the satellite 20.

FIG. 8 is a circuit diagram of an electronic device 100B according to embodiments.

Referring to FIG. 8, the electronic device 100B according to embodiments may include the plurality of electrical paths 231, 232, 233, and 234 and a bypass path 811.

The electronic device 100B illustrated in FIG. 8 may be understood as an example of the electronic device 100 illustrated in FIG. 1. In addition, it may be understood that the plurality of antennas 150, the RFIC 130, and the processor 110 of the electronic device 100B illustrated in FIG. 8 are actually the same as (or similar to) the corresponding components included in the electronic device 100A illustrated in FIG. 2.

Accordingly, the same reference numerals are used for components that are identical, actually the same as or similar to the above-described components, and descriptions that overlap with the above-described description are omitted to avoid redundancy.

In more detail, the electronic device 100B may include an RFFE 810 connected between the plurality of antennas 150 and the RFIC 130.

Furthermore, the RFFE 810 may include the plurality of electrical paths 231, 232, 233, and 234 connected to the plurality of antennas 150. In this case, the plurality of electrical paths 231, 232, 233, and 234 may include the band pass filters 211, 212, 213, and 214 that pass signals in a designated frequency band, respectively.

According to embodiments, the processor 110 may compare the quality of signals received from the plurality of electrical paths 231, 232, 233, and 234 connected to each of the plurality of antennas 150.

Furthermore, the processor 110 may receive a satellite signal through an electrical path that transfers a signal with the highest quality and an antenna connected to the corresponding electrical path, based on the quality of signals received from the plurality of electrical paths 231, 232, 233, and 234.

For example, when the quality of the signal received through the first electrical path 231 is the highest quality, the processor 110 may receive the satellite signal through the first antenna 151 and the first electrical path 231.

In addition, the RFFE 810 may include the single bypass path 811 connected in parallel with the plurality of electrical paths 231, 232, 233, and 234.

In this case, the bypass path 811 may be connected in parallel with the plurality of electrical paths 231, 232, 233, and 234 through the first switching circuit 311 and the second switching circuit 312. In this case, for example, the first switching circuit 311 may include a 4×5 switch including 4 input terminals and 5 output terminals, but is not limited thereto.

In addition, the bypass path 811 may be connected to the plurality of antennas 150 in parallel with the plurality of electrical paths 231, 232, 233, and 234.

According to embodiments, when the intensity of the signals received from the plurality of electrical paths 231, 232, 233, and 234 is less than a preset (or alternatively, given) reference value, the processor 110 may receive a satellite signal through the bypass path 811.

In more detail, when the intensity of the signals received from each of the plurality of electrical paths 231, 232, 233, and 234 is less than a preset (or alternatively, given) reference value, the processor 110 may receive a satellite signal through one antenna 151, 152, 153, or 154 and the bypass path 811.

Referring to the above-described configurations, when reception through an electrical path including a band pass filter is impossible in communication with the satellite 20 (or when the intensity of signals received through the electrical paths including the band pass filters are less than a reference value, the reference value corresponding to a level of communication reliability and/or quality), the electronic device 100B according to the present disclosure may receive a signal through the bypass path 811 that does not include a band pass filter.

Through this, the electronic device 100B may improve signal reception sensitivity when communicating with the satellite 20.

FIG. 9 is a circuit diagram of an electronic device 100C according to embodiments.

Referring to FIG. 9, the electronic device 100C according to embodiments may include a first RFFE 121 and a second RFFE 122 connected to the plurality of antennas 150.

The electronic device 100C illustrated in FIG. 9 may be understood as an example of the electronic device 100 illustrated in FIG. 1. In addition, it may be understood that the plurality of antennas 150, the RFIC 130, and the processor 110 of the electronic device 100C illustrated in FIG. 9 are actually the same as (or similar to) the corresponding components included in the electronic device 100A illustrated in FIG. 2.

Accordingly, the same reference numerals are used for components that are identical, actually the same as or similar to the above-described components, and descriptions that overlap with the above-described description are omitted to avoid redundancy.

In more detail, the electronic device 100C may include the first RFFE 121 and the second RFFE 122 connected between the plurality of antennas 150 and the RFIC 130.

According to embodiments, the first RFFE 121 may include a first sub-switch 921 connected to the first antenna 151 and the second antenna 152.

Furthermore, the first RFFE 121 may include the first electrical path 231 connected to the first antenna 151 through the first sub-switch 921. In addition, the first RFFE 121 may include the second electrical path 232 connected to the second antenna 152 through the first sub-switch 921.

In this case, the first antenna 151 may include the first band pass filter 211 that passes signals in a designated frequency band. In addition, the second antenna 152 may include the second band pass filter 212 that passes signals in a designated frequency band.

In addition, the first RFFE 121 may include a second sub-switch 922 connecting the first electrical path 231 and the second electrical path 232 to the RFIC 130.

The second RFFE 122 may include a third sub-switch 923 connected to the third antenna 153 and the fourth antenna 154.

The second RFFE 122 may include the third electrical path 233 connected to the third antenna 153 through the third sub-switch 923. In addition, the second RFFE 122 may include the fourth electrical path 234 connected to the fourth antenna 154 through the third sub-switch 923.

In this case, the third antenna 153 may include the third band pass filter 213 that passes signals in a designated frequency band. In addition, the fourth antenna 154 may include the fourth band pass filter 214 that passes signals in a designated frequency band.

In addition, the second RFFE 122 may include a fourth sub-switch 924 connecting the third electrical path 233 and the fourth electrical path 234 to the RFIC 130.

Furthermore, the first sub-switch 921 may be electrically connected to the third sub-switch 923. Through this, the signal received from the first antenna 151 or the second antenna 152 may be transferred to the third electrical path 233 or the fourth electrical path 234. In addition, the signal received from the third antenna 153 or the fourth antenna 154 may be transferred to the first electrical path 231 and the second electrical path 232.

Accordingly, when the quality or intensity of a received signal decreases due to path loss or loss of a band pass filter in an electrical path connected to a specific antenna, the processor 110 may allow the corresponding antenna to be connected to another electrical path.

For example, when the quality of the signal received through the third antenna 153 decreases due to loss of the third electrical path 233 or the third band pass filter 213, the processor 110 may control the first sub-switch 921 and the third sub-switch 923. Through this, the processor 110 may receive a satellite signal through the third antenna 153 and the second electrical path 232.

Therefore, the electronic device 100C according to the present disclosure may prevent (or reduce) signal loss due to the electrical path and the band pass filter. Furthermore, the electronic device 100C may improve the reception sensitivity of satellite signals.

The first RFFE 121 may include a first bypass path 911 connected in parallel with the first electrical path 231 and the second electrical path 232.

In this case, the first bypass path 911 may be connected in parallel with the first electrical path 231 and the second electrical path 232 through the first sub-switch 921 and the second sub-switch 922. In addition, the first bypass path 911 may be connected to the first antenna 151 and the second antenna 152 in parallel with the first electrical path 231 and the second electrical path 232.

In addition, the second RFFE 122 may include a second bypass path 912 connected in parallel with the third electrical path 233 and the fourth electrical path 234.

In this case, the second bypass path 912 may be connected in parallel with the third electrical path 233 and the fourth electrical path 234 through the third sub-switch 923 and the fourth sub-switch 924. In addition, the second bypass path 912 may be connected to the third antenna 153 and the fourth antenna 154 in parallel with the third electrical path 233 and the fourth electrical path 234.

According to embodiments, when the intensity of the signal received from the plurality of electrical paths 231, 232, 233, and 234 is less than a preset (or alternatively, given) reference value, the processor 110 may receive a satellite signal through the first bypass path 911 or the second bypass path 912.

In more detail, when the intensity of the signal received from at least some of the first electrical path 231 and the second electrical path 232 is less than a preset (or alternatively, given) reference value, the processor 110 may receive a satellite signal through the first antenna 151 or the second antenna 152 and the first bypass path 911.

For example, when the intensity of each signal received from the plurality of electrical paths 231, 232, 233, and 234 is less than the reference value, the processor 110 may receive a satellite signal through the first antenna 151 and the first bypass path 911.

In addition, when the intensity of the signal received from at least one of the third electrical path 233 and/or the fourth electrical path 234 is less than a preset (or alternatively, given) reference value, the processor 110 may receive a satellite signal through the third antenna 153 and the fourth antenna 154, and the second bypass path 912.

For example, when the intensity of the signal received from the fourth electrical path 234 is less than the reference value, the processor 110 may receive a satellite signal through the fourth antenna 154 and the second bypass path 912.

According to embodiments, the first RFFE 121 (and/or the second RFFE 122) may include a single bypass path (e.g., only one bypass path) connected to the plurality of antennas 150 through the first sub-switch 921 and the third sub-switch 923. According to embodiments, the single bypass path may be connected in parallel with the plurality of electrical paths 231, 232, 233, and 234 through the first sub-switch 921 to the fourth sub-switch 924.

In addition, in this case, when the intensity of the signal received from at least some of the plurality of electrical paths 231, 232, 233, and 234 is less than a preset (or alternatively, given) reference value, the processor 110 may receive a satellite signal through one antenna 151, 152, 153, or 154 and the single bypass path.

According to embodiments, the first RFFE 121 may include a plurality of bypass paths connected to the first antenna 151 and the second antenna 152, respectively. In addition, the second RFFE 122 may include the plurality of bypass paths connected to the third antenna 153 and the fourth antenna 154, respectively.

Therefore, in this case, when the intensity of the signal received from at least some of the plurality of electrical paths 231, 232, 233, and 234 is less than a preset (or alternatively, given) reference value, the processor 110 may receive a satellite signal through one antenna 151, 152, 153, or 154 and a bypass path connected to the corresponding antenna.

Referring to the above-described configurations, when reception through an electrical path including a band pass filter is impossible in communication with the satellite 20 (or when the intensity of signals received through the electrical path including the band pass filter is less than a reference value, the reference value corresponding to a level of communication reliability and/or quality), the electronic device 100C according to the present disclosure may receive a signal through at least one bypass path that does not include a band pass filter.

Through this, the electronic device 100C may improve signal reception sensitivity when communicating with the satellite 20.

As described above, the electronic device 100 according to embodiments of the present disclosure may receive a satellite signal through an antenna and an electrical path that transfer a signal with the highest quality among a plurality of electrical paths connected to each of the plurality of antennas 150.

In addition, when the intensity of the signal received through the electrical path including a band pass filter is less than a preset (or alternatively, given) reference value, the electronic device 100 according to embodiments of the present disclosure may receive a satellite signal through a bypass path that does not include a band pass filter and is connected in parallel with an electrical path.

Through this, the electronic device 100 according to embodiments of the present disclosure may improve the reception sensitivity of satellite signals when communicating with the satellite 20. Furthermore, the electronic device 100 may maintain a communication connection with the satellite 20 in a situation where the sensitivity of the signal received from the satellite 20 decreases.

According to embodiments of the present disclosure, the electronic device may receive a satellite signal through an electrical path or a bypass path connected to an antenna, based on the reception state of the satellite signal. Through this, the electronic device may improve reception sensitivity for satellite signals.

Conventional devices and methods for receiving satellite signals from a satellite pass the satellite signals through a SAW filter to perform out of band blocking. However, the SAW filter reduces the transmission gain of the satellite signals and, in at least some cases, the resulting intensity of the satellite signals passed through the SAW filter is insufficient to provide communication of sufficient reliability and/or quality. Indeed, in some cases, this reduction in intensity results in disconnection of a communication connection with the satellite.

However, according to embodiments, improved devices and methods are provided for receiving satellite signals from a satellite. For example, the improved devices and methods switch a communication path from an electrical path including a band pass filter to a bypass path not including a band pass filter in cases in which the gain reduction over the band pass filter of the electrical path causes an intensity of the satellite signal to fall below a reference level. Accordingly, in these cases the improved devices and methods enable a link margin to be secured and reception sensitivity to be improved. Therefore, the improved devices and methods overcome the deficiencies of the conventional devices and methods to at least improve communication reliability and/or quality.

According to embodiments, operations described herein as being performed by the electronic device 100, the satellite 20, the RFFE 120, the RFIC 130, the processor 110, the first band pass filter 211, the second band pass filter 212, the third band pass filter 213, the fourth band pass filter 214, the first switching circuit 311, the second switching circuit 312, the MUX 340, the ADC1, ADC2, the ADC3, the ADC4, the first switch 331, the first amplifier LNA1, the second switch 332, the electronic device 100B, the RFFE 810, the electronic device 100C, the first RFFE 121, the second RFFE 122, the first sub-switch 921, the second sub-switch 922, the third sub-switch 923, and/or the fourth sub-switch 924 may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The various operations of methods described above may be performed by any suitable device capable of performing the operations, such as the processing circuitry discussed above. For example, as discussed above, the operations of methods described above may be performed by various hardware and/or software implemented in some form of hardware (e.g., processor, ASIC, etc.).

The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or operations of a method or algorithm and functions described in connection with embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium (e.g., the memory storing the priority discussed above). A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Embodiments in which a design is changed simply or which are easily changed may be included in the present disclosure as well as embodiments described above. In addition, technologies that are easily changed and implemented by using embodiments described above may be included in the present disclosure. While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An electronic device comprising:
a plurality of antennas, each of the plurality of antennas being configured to receive a satellite signal from a satellite;
a plurality of electrical paths connected to the plurality of antennas, each of the plurality of electrical paths including a band pass filter configured to pass a signal of a corresponding frequency band;
at least one bypass path connected in parallel with the plurality of electrical paths and connected to the plurality of antennas; and
processing circuitry connected to the plurality of electrical paths and the at least one bypass path, the processing circuitry being configured to
receive the satellite signal through a first antenna and a first electrical path based on a quality of a signal received through the first electrical path connected to the first antenna being highest among qualities of respective signals received through the plurality of electrical paths, the plurality of electrical paths including the first electrical path, and the plurality of antennas including the first antenna, and
receive the satellite signal through one of the plurality of antennas and the at least one bypass path based on an intensity of the signal received through the first electrical path being less than a reference value.

2. The electronic device of claim 1, wherein the processing circuitry is configured to:
determine a respective intensity of each signal received through a subset of the plurality of electrical paths based on the intensity of the signal received through the first electrical path being less than the reference value, the subset of the plurality of the electrical paths not including the first electrical path; and
receive the satellite signal through one of the plurality of antennas and the at least one bypass path in response to determining the respective intensity of each signal received through the subset of the plurality of electrical paths is less than the reference value.

3. The electronic device of claim 1, wherein the processing circuitry is configured to:
determine a respective intensity of each signal received through a subset of the plurality of electrical paths based on the intensity of the signal being less than the reference value, the subset of the plurality of the electrical paths not including the first electrical path; and
receive the satellite signal through one among the plurality of electrical paths which transfers a signal having the intensity greater than or equal to the reference value in response to determining the respective intensity of at least some of the electrical paths other than the first electrical path is greater than or equal to the reference value.

4. The electronic device of claim 1, wherein
the at least one bypass path includes a first bypass path connected in parallel with the first electrical path; and
the processing circuitry is configured to receive the satellite signal through the first antenna and the first bypass path based on the intensity of the signal received through the first electrical path being less than the reference value.

5. The electronic device of claim 4, wherein
the plurality of electrical paths include a second electrical path connected to a second antenna among the plurality of antennas;
the at least one bypass path includes a second bypass path connected to the second antenna in parallel with the second electrical path; and
the processing circuitry is configured to receive the satellite signal through the second antenna and the second bypass path based on an intensity of a signal received through the first antenna and the first bypass path being less than the reference value.

6. The electronic device of claim 1, further comprising:
a first switching circuit configured to selectively connect each of the plurality of antennas to the plurality of electrical paths or the at least one bypass path; and
a second switching circuit configured to connect the processing circuitry with one of
the plurality of electrical paths, or
the at least one bypass path.

7. The electronic device of claim 1, wherein the quality of the signal is based on at least one of a reference signal received power (RSRP), a reference signal received quality (RSRQ), a signal to noise ratio (SNR), a received signal strength indicator (RSSI), or a signal to interference plus noise ratio (SINR).

8. The electronic device of claim 5, wherein
the plurality of antennas includes a third antenna and a fourth antenna; and
the plurality of electrical paths include a third electrical path and a fourth electrical path, the third electrical path being connected to the third antenna, and the fourth electrical path being connected to the fourth antenna.

9. The electronic device of claim 8, wherein the at least one bypass path includes:
a third bypass path connected to the third antenna in parallel with the third electrical path; and
a fourth bypass path connected to the fourth antenna in parallel with the fourth electrical path.

10. The electronic device of claim 1, wherein
the processing circuitry supports a satellite communication protocol in a non-terrestrial network; and
the satellite communication protocol includes a long-term evolution (LTE) protocol, a new radio (NR) protocol, or a narrow band Internet of Things (NB-IoT) protocol.

11. A wireless communication method using a plurality of antennas, the wireless communication method comprising:
determining a quality of each of a plurality of signals respectively received through a plurality of electrical paths, the plurality of electrical paths being connected to each of the plurality of antennas;
receiving a satellite signal through a first antenna and a first electrical path in response to determining that the quality of a signal received through the first electrical path connected to the first antenna is highest among the qualities of respective signals received through the plurality of electrical paths, the plurality of electrical paths including the first electrical path, the plurality of antennas including the first antenna, the plurality of signals including the signal and the respective signals, and the first electrical path including a first band pass filter configured to pass a signal of a corresponding frequency band; and
receiving the satellite signal through at least one bypass path connected in parallel with the plurality of electrical paths based on an intensity of a signal received through the first electrical path being less than a reference value.

12. The wireless communication method of claim 11, wherein the receiving of the satellite signal through the at least one bypass path comprises:
determining a respective intensity of each signal received through a subset of the plurality of electrical paths based on the intensity of the signal received through the first electrical path being less than the reference value, the subset of the plurality of the electrical paths not including the first electrical path; and
receiving the satellite signal through one of the plurality of antennas and the at least one bypass path in response to determining the respective intensity of each signal received through the subset of the plurality of electrical paths is less than the reference value.

13. The wireless communication method of claim 11, further comprising:
determining a respective intensity of each signal received through a subset of the plurality of electrical paths based on the intensity of the signal being less than the reference value, the subset of the plurality of the electrical paths not including the first electrical path; and
receiving the satellite signal through one among the plurality of electrical paths which transfers a signal having the intensity greater than or equal to the reference value in response to determining the respective intensity of at least one signal received through the subset of the plurality of electrical paths is greater than or equal to the reference value.

14. The wireless communication method of claim 11, wherein
the at least one bypass path includes a first bypass path connected to the first antenna in parallel with the first electrical path; and
the receiving of the satellite signal through the at least one bypass path includes receiving the satellite signal through the first antenna and the first bypass path based on the intensity of the signal received through the first electrical path being less than the reference value.

15. The wireless communication method of claim 14, wherein the plurality of electrical paths includes a second electrical path connected to a second antenna among the plurality of antennas, the second electrical path including a second band pass filter configured to pass the signal of the corresponding frequency band;

the at least one bypass path further includes a second bypass path connected in parallel with the second electrical path; and the method further comprises receiving the satellite signal through the second antenna and the second bypass path abased on an intensity of a signal received through the first antenna and the first bypass path being less than the reference value.

16. An antenna device comprising:

a first antenna configured to receive a satellite signal from a satellite;

a first electrical path connected to the first antenna, the first electrical path including a first band pass filter configured to pass a signal of a corresponding frequency band;

a first bypass path connected to the first antenna in parallel with the first electrical path; and processing circuitry connected to the first electrical path and the first bypass path, the processing circuitry being configured to receive the satellite signal through the first antenna and the first bypass path based on an intensity of a signal received through the first antenna and the first electrical path being less than a reference value.

17. The antenna device of claim 16, further comprising:

a second antenna configured to receive the satellite signal; and a second electrical path connected to the second antenna and the processing circuitry, the second electrical path including a second band pass filter configured to pass the signal of the corresponding frequency band, wherein the processing circuitry is configured to compare a signal quality of the signal received through the first antenna and the first electrical path with a signal quality of a signal received through the second antenna and the second electrical path to obtain a comparison result, and receive the satellite signal through the second antenna and the second electrical path in response to determining the signal quality of the signal received through the second antenna and the second electrical path is better than the signal quality of the signal received through the first antenna and the first electrical path based on the comparison result.

18. The antenna device of claim 17, wherein the processing circuitry is configured to:

determine an intensity of a fourth signal received through the second antenna and the second electrical path based on the intensity of the signal received through the first antenna and the first electrical path being less than the reference value; and receive the satellite signal through the first antenna and the first bypass path in response to determining the intensity of the fourth signal is less than the reference value.

19. The antenna device of claim 18, further comprising:

a second bypass path connected to the second antenna in parallel with the second electrical path, wherein the processing circuitry is configured to receive the satellite signal through the second antenna and the second bypass path based on an intensity of the signal received through the first antenna and the first bypass path being less than the reference value.

20. The antenna device of claim 16, further comprising:

a first switch configured to selectively connect the first antenna to the first electrical path or the first bypass path; and a second switch configured to selectively connect the processing circuitry with the first electrical path or the first bypass path.

\* \* \* \* \*